(12) United States Patent
Kondo

(10) Patent No.: US 7,023,669 B2
(45) Date of Patent: Apr. 4, 2006

(54) MAGNETIC HEAD USING A MAGNETO-RESISTIVE EFFECT

(75) Inventor: Reiko Kondo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 269 days.

(21) Appl. No.: 09/815,562

(22) Filed: Mar. 23, 2001

(65) Prior Publication Data

US 2001/0036045 A1    Nov. 1, 2001

(30) Foreign Application Priority Data

Apr. 28, 2000    (JP)    ............................. 2000-131438

(51) Int. Cl.
*G11B 5/127*    (2006.01)

(52) U.S. Cl. .................................................. 360/322

(58) Field of Classification Search ................ 360/322, 360/324.1, 324.12, 324.2, 324.11, 327.2, 360/327.23, 327.21, 324, 313
See application file for complete search history.

(56) References Cited

U.S. PATENT DOCUMENTS

| | | | |
|---|---|---|---|
| 5,438,470 A * | 8/1995 | Ravipati et al. ............. | 360/322 |
| 5,668,688 A * | 9/1997 | Dykes et al. ............. | 360/324.1 |
| 6,327,123 B1 * | 12/2001 | Kawato et al. ........ | 360/324.11 |
| 6,490,139 B1 * | 12/2002 | Hayashi et al. ............. | 360/322 |
| 6,535,363 B1 * | 3/2003 | Hosomi et al. .......... | 360/324.1 |
| 6,574,079 B1 * | 6/2003 | Sun et al. ................ | 360/324.2 |
| 6,587,318 B1 * | 7/2003 | Komuro et al. .......... | 360/324.2 |
| 6,710,984 B1 * | 3/2004 | Yuasa et al. ........... | 360/324.11 |
| 6,718,621 B1 * | 4/2004 | Hayashi et al. .......... | 29/603.08 |
| 6,801,410 B1 * | 10/2004 | Xue et al. .................... | 360/321 |

* cited by examiner

*Primary Examiner*—Allen Cao
(74) *Attorney, Agent, or Firm*—Greer. Burns & Crain, Ltd.

(57) ABSTRACT

A fabricating process of a magnetic head includes the steps of forming a magneto-resistive film, forming a resist film on the magneto-resistive film, patterning the resist film to form a resist pattern, conducting a process while using the resist pattern as a mask, causing a shrinkage in the resist pattern, and conducting a second process while using the shrunken resist pattern as a mask.

5 Claims, 6 Drawing Sheets

MAGNETIC HEAD USING A MAGNETO-RESISTIVE EFFECT

CROSS-REFERENCE TO RELATED APPLICATION

The present application is based on Japanese priority application No. 2000-131438 filed on Apr. 28, 2000, the entire contents of which are hereby incorporated by reference.

BACKGROUND OF THE INVENTION

The present invention generally relates to magnetic recording of information and more particularly to a high-sensitivity magnetic head for use in a magnetic disk drive for reading information from a magnetic disk by utilizing magneto-resistive effect.

A magneto-resistive head that uses magneto-resistive effect for reading magnetic information from a magnetic disk has an advantageous feature in that it provides an output signal more or less independently to a scanning speed of the magnetic head over a magnetic disk, on which information is recorded in the form of minute magnetic dots. Thus, a magneto-resistive head is suitable for a use in high-density magnetic disk drives in which a magnetic head is required to reproduce information from magnetic dots that are recorded on the magnetic disk surface with high density and reduced mutual separation.

With the progress in the art of high-density magnetic recording, the demand imposed on a magnetic head for detection of high-density magnetic information is becoming more and more stringent. In order to reproduce information from minute magnetic dots formed on a magnetic disk with rapidly reduced bit length and track width, it is necessary to increase the sensitivity of the magnetic head accordingly.

Figure 1A:
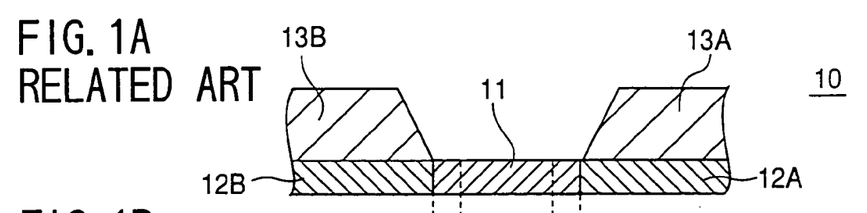
FIGS. 1A and 1B are diagram showing the cross-sectional structure of a magneto-resistive head according to a related art.

FIG. 1A shows the construction of a magneto-resistive head 10 used in conventional high-density magnetic disk drives.

Referring to FIG. 1A, the magneto-resistive head 10 includes a magneto-resistive film 11 for detection of magnetic field, wherein the magneto-resistive film 11 changes a resistance thereof in response to a magnetic field applied thereto, and the magneto-resistive head 10 achieves the detection of the magnetic field by measuring the magneto-resistance of the magneto-resistive film 11.

For this purpose, electrodes 13A and 13B are provided on the magneto-resistive film 11 for causing to flow a sensing current through the magneto-resistive film 11, wherein the electrodes 13A and 13B are respectively provided on domain control regions 12A and 12B disposed at both lateral sides of the magneto-resistive film 11 for domain control of the magneto-resistive film 11. More specifically, the domain control regions 12A and 12B are formed of a hard magnetic material such as CoCr having a large coercive force or an anti-ferromagnetic film such as PdPtMn and eliminate formation of magnetic domains in the magneto-resistive film 11 takes a mono-domain structure, and Barkhausen noise, caused as a result of movement of domain walls, is effectively eliminated.

In the magneto-resistive head 10 of FIG. 1A, the magneto-resistive film 11 may be formed of a single-layer anisotropic magneto-resistive (AMR) film or a giant magneto-resistive (GMR) film, wherein the GMR film may be a spin-valve film or a tunneling magneto-resistive (TMR) film. A spin-valve film includes an anti-ferromagnetic pinning layer, a ferromagnetic pinned layer provided adjacent to the anti-ferromagnetic pinning layer, and a ferromagnetic free layer provided in the vicinity of the ferromagnetic pinned layer provided in the vicinity of the ferromagnetic pinned layer via an intervening non-magnetic conducting film. A TMR film includes an anti-ferromagnetic pinning layer, a ferromagnetic pinned layer provided adjacent to the anti-ferromagnetic pinning layer, and a ferromagnetic free layer provided in the vicinity of the ferromagnetic pinned layer via an intervening tunneling insulation film. In the case a GMR film or TMR film is used for the magneto-resistive film 11 in the magnetic head 10 of FIG. 1A, it should be noted that the domain control regions 12A and 12B control the domain formation in the ferromagnetic free layer by causing a localized pinning of magnetization in the ferromagnetic free layer.

In view of the fact that the domain control regions 12A and 12B achieve the desired domain control in the ferromagnetic free layer by causing a local pinning of magnetization as noted above, there are formed dead regions in the magneto-resistive film 11 designated as INS in FIG. 1A in which the magnetization of the free layer does not change substantially even when a magnetic field from a magnetic dot on the magnetic disk is applied.

In the construction of FIG. 1A, the sensing current from the electrode 13A to the electrode 13B inevitably flows through a path that crosses the dead regions INS and the sensitivity of magnetic detection is deteriorated.

Figure 1B:
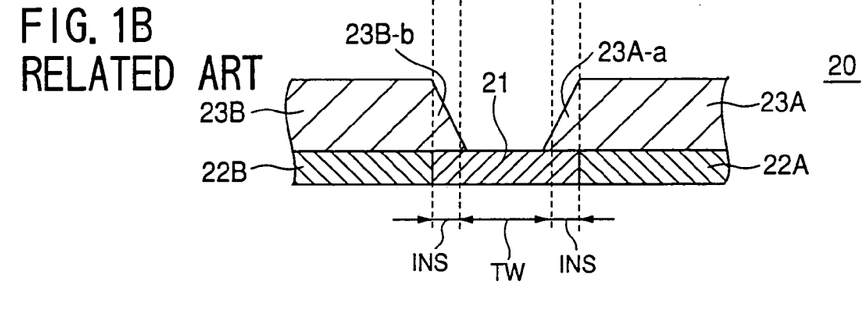

In view of the drawback of the magnetic head 10 of FIG. 1A, there is proposed a magneto-resistive head 20 having a so-called overlaid structure as represented in FIG. 1B, in which electrodes 23A and 23B respectively corresponding the electrodes 13A and 13B are provided on domain control regions 22A and 22B respectively corresponding to the domain control regions 12A and 12B of FIG. 1A, such that each of the electrodes 23A and 23B includes a tip-end region 23A-a or 23B-b that extends over a magneto-resistive film 21 in the direction of the other, opposing electrode, beyond the dead region INS. According to the construction of the magneto-resistive head 20 of FIG. 1B, the sensing current flows through the magneto-resistive film 21 corresponding to the magneto-resistive film 11 while avoiding the dead regions INS, and the sensitivity of the magneto-resistive sensor 20 is improved.

Figure 2:
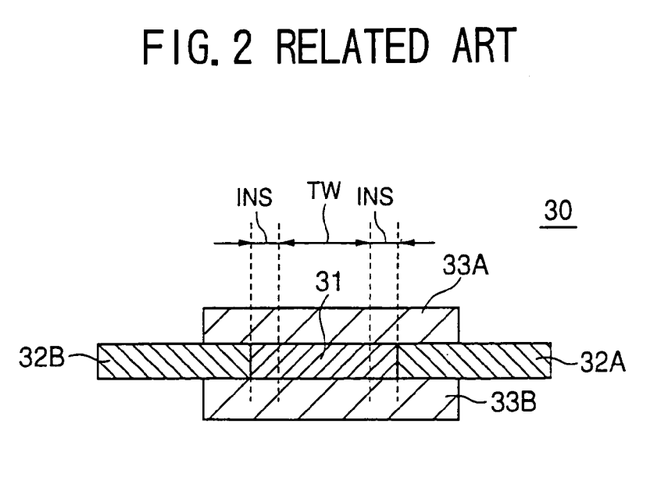
FIG. 2 is a diagram showing the cross-sectional structure of a magneto-resistive head according to another related art.

Further, there is proposed a magneto-resistive head 30 having a CPP structure as noted in FIG. 2, in which the sensing current is caused to flow perpendicularly to a magneto-resistive film 31.

Referring to FIG. 2, it can be seen that domain control regions 32A and 32B are provided at both lateral sides of the magneto-resistive film 31 for magnetic domain control, wherein the sensing current is caused to flow through the magneto-resistive film 31 perpendicularly between an upper electrode 33A provided on the magneto-resistive film 31 and a lower electrode 33B provided under the magneto-resistive film 31. The magnetic head 30 having the CPP construction noted above is advantageous for high-sensitivity detection of the magneto-resistance change caused by an external magnetic field. In the magneto-resistive head 30, too, it is possible to use a GMR film such as a spin-valve film or TMR film for the magneto-resistive film 31.

On the other hand, the magneto-resistive head 30 of the CPP structure of FIG. 2 has a drawback, while being able to increase the sensitivity of the magneto-resistive film 31 itself, in that the dead regions INS are formed within the path of the sensing current as a result of local magnetic pinning action of the domain control regions 32A and 32B similarly to the magneto-resistive head 10 of FIG. 1A and that the existence of the dead regions INS in the sensing current path reduce the effective core width TW of the magneto-resistive film 31 used for magnetic detection. Because of the reduced effective core width TW, the magnetic head 30 can detect only a part of the magnetic information recorded on a magnetic track of the magnetic disk even in such a case where the magnetic head 30 has a geometrical or so-called optical core width corresponding to the track width on the magnetic disk. Further, the dead regions INS tend to cause a disturbance in the sensing current flowing through the magneto-resistive film 31 perpendicularly.

In the case of the magneto-resistive head 20 of FIG. 1B, on the other hand, the problem of the sensitivity degradation caused by the dead regions INS is avoided successfully by providing the protruding tip-end regions 23A-a and 23B-b for the electrodes 23A and 23B such that the sensing current is caused to flow preferentially in the geometrical or optical core region defined between the opposing tip-end regions 23A-a and 23B-b, as noted before.

On the other hand, the magneto-resistive head 20 of FIG. 1B has a drawback in that the protrusion of the tip regions 23A-a and 23B-b beyond the dead regions INS tends to cause an increase in the effective core width TW over the geometrically defined optical core width, as a result of the distribution profile of the sensing current formed underneath the tip-end regions 23A-a and 23B-b protruding beyond the dead regions INS. It should be noted that exact control of the process for forming the electrodes 23A and 23B with the tip-end regions 23A-a and 23B-b in exact alignment with the inner edge of the dead region INS has been difficult. Further, the magneto-resistive head 20 of FIG. 1B tends to suffer from the problem of positional offset of the tip regions 23A-a and 23B-b with respect to the core region TW. It should be noted that the domain control regions 22A and 22B are formed by a process different from the process of forming the electrodes 23A and 23B, and because of this, it is generally inevitable that such a positional offset is caused.

SUMMARY OF THE INVENTION

Accordingly, it is a general object of the present invention to provide a novel and useful magneto-resistive head wherein the foregoing problems are eliminated.

Another and more specific object of the present invention is to provide a magneto-resistive head having an improved sensitivity and a fabrication process thereof.

Another object of the present invention is to provide a method of fabricating a magnetic head, comprising the steps of:

forming a magneto-resistive film;
forming a resist film on said magneto-resistive film;
patterning said resist film to form a resist pattern; and
causing a shrinkage in said resist pattern.

According to the present invention, it is possible to form various patterns of the magnetic head in ideal alignment by using the resist pattern and the shrunken resist pattern in respective patterning processes.

Another object of the present invention is to provide a magnetic head, comprising:

a magneto-resistive film having a ferromagnetic free layer at a top part thereof, said ferromagnetic free layer changing a magnetization thereof in response to an external magnetic field;

a pair of magnetic domain control patterns provided on said ferromagnetic free layer, each of said magnetic domain control patterns causing a pinning of magnetization in said ferromagnetic free layer in the vicinity thereof;

a first electrode provided on said ferromagnetic free layer in contact therewith at a region located between said pair of magnetic domain control regions; and a second electrode provided in electrical contact with a bottom surface of said magneto-resistive film.

Another object of the present invention is to provide a method of fabricating a magnetic head, comprising the steps of:

forming a magneto-resistive film on a substrate such that said magneto-resistive film includes a ferromagnetic layer on a top part thereof;

depositing a resist film on said magneto-resistive film such that said resist film covers said ferromagnetic layer;

patterning said resist film to form a resist pattern;

depositing a high-coercive magnetic film having a coercive force larger than a coercive force of said ferromagnetic layer in said magneto-resistive film on said magneto-resistive film while using said resist pattern as a mask, to form a pair of high-coercive magnetic regions at both lateral sides of said resist pattern;

causing a shrinkage in said resist pattern to form a shrunken resist pattern;

depositing an insulating film on said magneto-resistive film such that said insulating film covers said high-coercive magnetic regions and further said shrunken resist pattern;

removing said shrunken resist pattern together with a part of said insulating film covering said shrunken resist pattern so as to expose a part of said magneto-resistive film on which said shrunken resist pattern has been provided; and depositing an electrode layer on said insulating film such that said electrode layer makes a contact with said exposed part of said magneto-resistive film.

According to the present invention, it becomes possible to inject a sensing current into the ferromagnetic free layer from the first electrode while avoiding the dead regions in which local pinning of magnetization is caused by the magnetic domain control regions. Thereby, the sensitivity of magnetic detection is effectively maximized in a magnetic head having a CPP structure. By providing the magnetic domain control regions over the ferromagnetic free layer, the pinning of magnetization is caused primarily in the part of the ferromagnetic free layer located right underneath the domain control regions. Thus, no substantial dead region is formed in the core region of the magnetic head used for detecting magnetic signals from a magnetic track formed on a magnetic disk.

Another object of the present invention is to provide a magnetic head, comprising:

a magneto-resistive film;

a pair of magnetic domain control patterns provided at both lateral sides of said magneto-resistive film, each of said magnetic domain control patterns causing a pinning of magnetization in said magneto-resistive film in the vicinity thereof;

a pair of electrodes provided respectively on said pair of magnetic domain control regions with a mutual separation from each other, each electrode having a tip-end part extending over said magneto-resistive film toward the other electrode, wherein each tip-end part extends beyond said domain control region, on which said electrode having said tip-end part is provided, with a protruding distance of 0.25 μm or less.

Another object of the present invention is to provide a method of fabricating a magnetic head, comprising the steps of:

forming a magneto-resistive film on a substrate;
forming a resist film on said magneto-resistive film;
patterning said resist film to form a resist pattern;
patterning said magneto-resistive film while using said resist pattern as a mask to form a magneto-resistive pattern;
depositing a magnetic film having a coercive force larger than a coercive force of said magneto-resistive film while using said resist pattern as a mask, such that a pair of high-coercive magnetic regions having a large coercive force are formed at both lateral sides of said magneto-resistive pattern from said ferromagnetic film;
causing a shrinkage in said resist pattern;
depositing a conductive layer on said magneto-resistive film while using said shrunken resist pattern as a mask, such that said electrode layer forms a pair of electrode patterns respectively covering said high-coercive magnetic region.

According to the present invention, it becomes possible to reduce the deviation between the geometrical or optical core width and the effective or electrical core width in a magneto-resistive head having an overlaid structure, by employing a self-alignment process that uses a shrunken resist pattern for controlling the protruding distance of the tip end part of the electrodes. As a result of the use of the self-alignment process, it becomes possible to reduce the protruding distance of the tip-end part of the electrode beyond the high-coercive region formed underneath to be 0.25 µm or less. Thereby, the injection of the sensing current is caused only from the very tip end of the protruding tip-end part, while successfully avoiding unwanted injection of the sensing current from the remaining part of the tip-end part protruding beyond the dead region. Thereby, the sensitivity of magnetic signals from a narrow magnetic track is improved.

Other objects and further features of the present invention will become apparent from the following detailed description when read in conjunction with the attached drawings.

DETAILED DESCRIPTION OF THE INVENTION

[First Embodiment]

FIGS. 3A–3H show the fabrication process of a magneto-resistive head 100 of CPP type according to a first embodiment of the present invention.

Figure 3A:
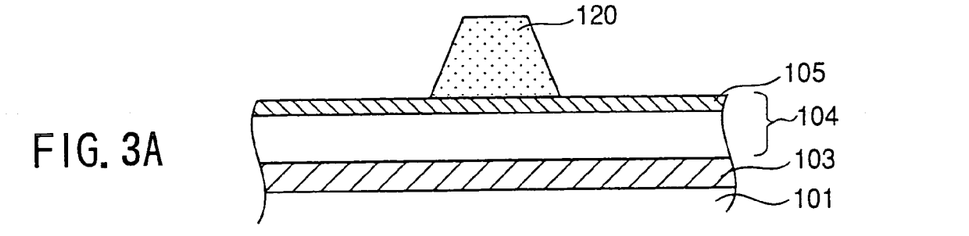
FIGS. 3A–3H are diagrams showing the fabrication process of a magneto-resistive head according to a first embodiment of the present invention.

Referring to FIG. 3A, a bottom electrode film 103 and a magneto-resistive film 104 are deposited consecutively on a substrate 101, wherein the bottom electrode film 103 may be a Pt film while the magneto-resistive film 104 may be a GMR film having a spin-valve structure. For example, the magneto-resistive film 104 may include a consecutive stacking of an anti-ferromagnetic film of IrMn forming a pining layer, a ferromagnetic film of NiFe having a magnetization pinned by the anti-ferromagnetic film and acting as a pinned layer, a non-magnetic film of Cu acting as a non-magnetic conducting layer, and a ferromagnetic film of NiFe forming a free layer having a magnetization that changes in response to an external magnetic field, wherein the anti-ferromagnetic film may be replaced by a ferrimagnetic film having a stacked structure of PdPtMn/CoFeB/Ru/CoFeB. Further, the magneto-resistive film 104 may be formed of a TMR film in which an anti-ferromagnetic pinning layer of PdPtMn, a ferromagnetic pinned layer of NiFe, a tunneling oxide film of $AlO_x$ and a ferromagnetic free layer of NiFe are stacked consecutively. Alternatively, the magneto-resistive layer 104 may be formed of a single layer of anisotropic magneto-resistive (AMR) film such as NiFe or an artificial superlattice structure such as [CoFe/Co]10.

In the construction of FIG. 3A, it should be noted that the magneto-resistive film 104 includes the magnetic free layer at the top part thereof, as represented by a layer 105. Thus, the free layer 105 may be a NiFe ferromagnetic film in the case the magneto-resistive film 104 has a spin-valve structure or a TMR structure.

In the step of FIG. 3A, a resist pattern 120 is formed on the ferromagnetic film 104 by applying a resist film, followed by a photolithographic patterning process.

Figure 3B:
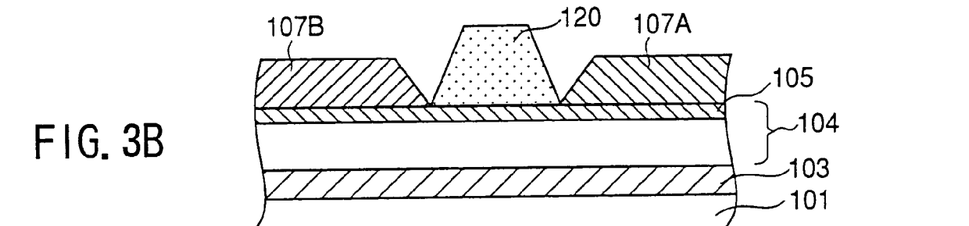

Next, in the step of FIG. 3B, a layer of a high-coercive magnetic material having a large coercive force, such as a hard magnetic material, an example of which may be a CoCrPt alloy, or an anti-ferromagnetic material such as a PdPtMn alloy, is deposited on the structure of FIG. 3A by a sputtering process while using the resist pattern 120 as a mask. As a result, high-coercive magnetic regions 107A and 107B are formed on the magneto-resistive film 104 at both lateral sides of the resist pattern 120.

Figure 3C:
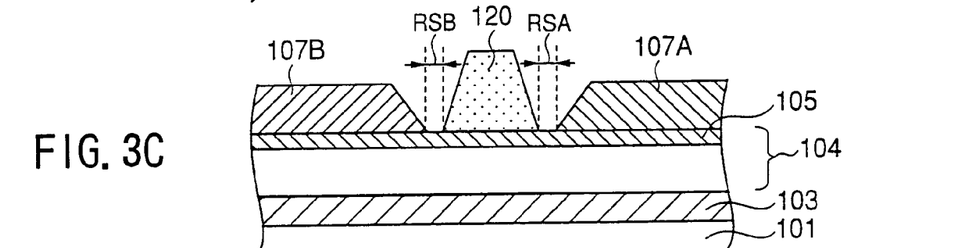

Next, in the step of FIG. 3C, the resist pattern 120 is subjected to a shrinking process, which may be any of a heat-treatment process, chilling process, oxygen-ashing process, a drying process, or other suitable chemical and/or physical processes, wherein the resist pattern 120 undergoes shrinking as a result of such a process and there are formed gaps RSA and RSB between the shrunken resist pattern 120 and the high-coercive regions 107A and 107B.

Figure 3D:
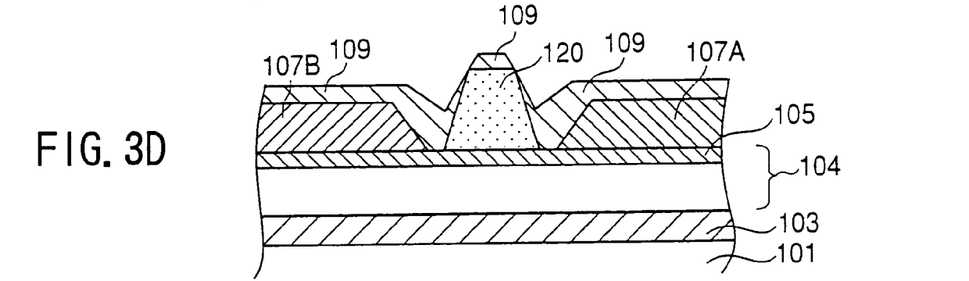

Next, in the step of FIG. 3D, an insulating film 109 of $Al_2O_3$ or $SiO_2$ is deposited on the structure of FIG. 3C such that the insulating film 109 makes a contact with the ferromagnetic free layer at the top part of the magneto-resistive film 104 in the regions corresponding to the foregoing gaps RSA and RSB.

Figure 3E:
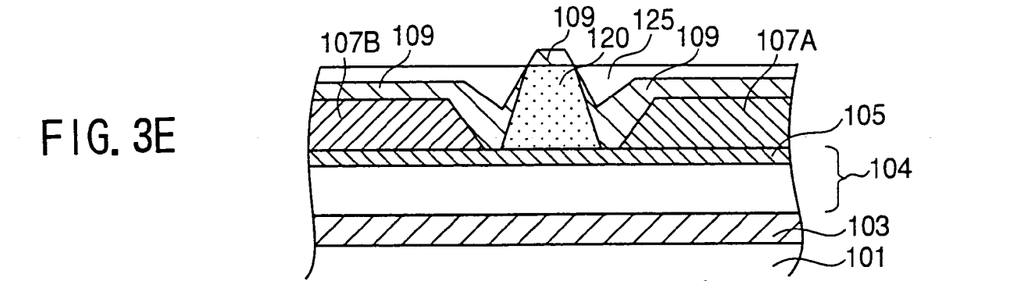

Next, in the step of FIG. 3E, a planarizing resist film 125 is applied on the structure of FIG. 3D for planarization and the planarized structure thus obtained is subjected to an etching process so as to remove the insulating film 109 forming a cap on the shrunken resist pattern 120. After the removal of the cap film, the resist pattern 120 is removed by dissolution into a solvent or a suitable ashing process, and the structure shown in FIG. 3F is obtained in which the surface of the ferromagnetic free layer 105 is exposed between the insulating films 109A and 109B respectively covering the high-coercive patterns 107A and 107B.

Figure 3F:
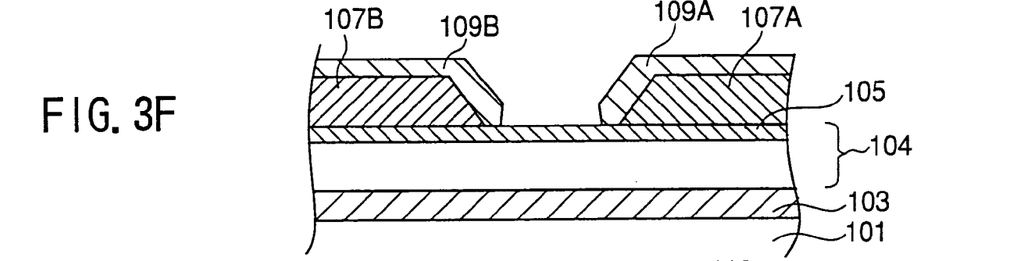

In the event the resist pattern 120 is in the state suitable for removal by dissolution into solvent or ashing process in the step of FIG. 3D, the fabrication process of the magnetic head may jump to the step of FIG. 3F directly from the step of FIG. 3D.

In the state of FIG. 3F, it should be noted that the insulating film 109A covers the part of the ferromagnetic free layer 105 in correspondence to the gap RSA and the insulating film 109B covers the part of the ferromagnetic free layer 105 in correspondence to the gap RSB.

Figure 3G:
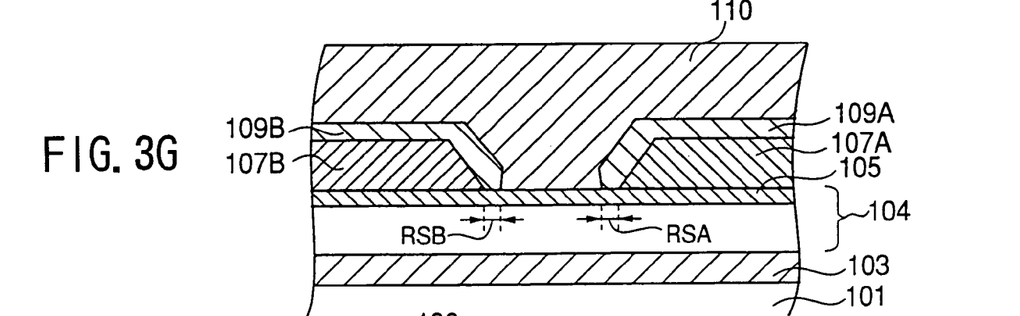

Next, in the step of FIG. 3G, a top electrode layer 110 of typically Pt is deposited on the structure of FIG. 3F by a sputtering process, wherein the Pt electrode 110 thus formed makes a contact with the part of the ferromagnetic free layer 105 exposed between the insulating film 109A on the high-coercive region 107A and the insulating film 109B covering the high-coercive region 107B.

Figure 3H:
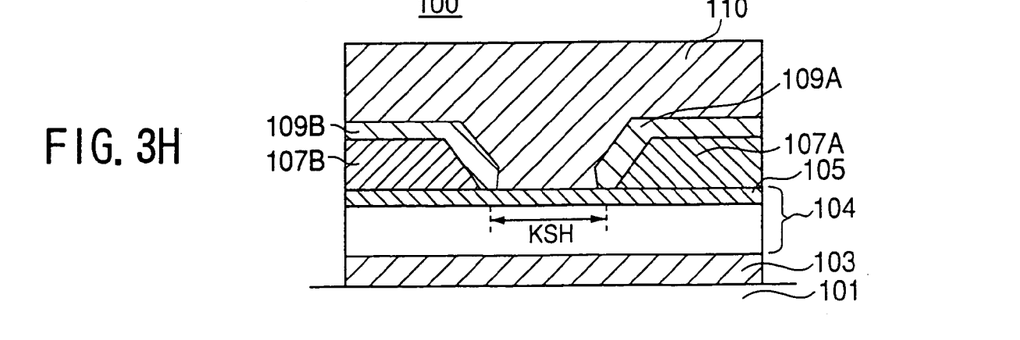

After the step of FIG. 3G, the layered structure on the substrate 101 is patterned in the step of FIG. 3H by a suitable process such as an ion milling process, and interconnections (not shown) are provided to the top electrode layer 110 and the bottom electrode 103.

In the magnetic head of FIG. 3H thus obtained, it should be noted that the high-coercive regions 107A and 107B cause a pinning of magnetization in the ferromagnetic free layer 105 in correspondence to the part located right underneath the regions 107A and 107B, and the problem of formation of multiple domain structure in the magneto-resistive film 104 and associated problem of formation of Barkhausen noise are effectively eliminated. Thus, by measuring the resistance of the magneto-resistive film 104 by way of measurement of the sensing current caused to flow from the top electrode 110 to the bottom electrode 103, it is possible to detect an external magnetic field produced by a magnetic dot on a magnetic disk with high sensitivity.

According to the present embodiment, the magneto-resistive head of FIG. 3H has an advantageous feature in that injection of the sensing current is made selectively into the magneto-resistive film in correspondence to the region located inside the part covered by the insulating films 109A and 109B. Thus, by choosing the thickness of the insulating film 109, and hence the thickness of the insulating films 109A and 109B, appropriately in the step of FIG. 3D in correspondence to the thickness or width of the magnetically pinned region caused by the high-coercive regions 107A and 107B, it is possible to avoid injection of the sensing current into the dead region in which the pinning of the magnetization is caused. Thereby, the sensing current picks up the change of resistance of the magneto-resistive film 104 with high sensitivity.

As the same resist pattern 120 is used in the step of FIG. 3B when forming the high-coercive regions 107A and 107B and in the step of FIG. 3D for forming the insulating patterns 109A and 109B, there occurs no problem of positional offset for the insulating patterns 109A and 109B with respect to the high-coercive regions 107A and 107B, and the structure of FIG. 3H is obtained with high reproducibility and high yield, even in such a case the separation between the high-coercive regions 107A and 107B is narrowed in correspondence to increase of recording density on the magnetic disk.

In FIG. 3H, it should be noted that the regions designated by KSH represents an optical core regions or a geometrical core regions structurally defined with respect to a magnetic track on the magnetic disk, wherein the present invention enables formation of the magneto-resistive head such that the optical core regions substantially coincides with the actual core regions in which actual magnetic detection of a magnetic track takes place.

[Second Embodiment]

FIGS. 4A–4F show the fabrication process of a magneto-resistive head 200 of the overlaid type according to a second embodiment of the present invention.

Figure 4A:
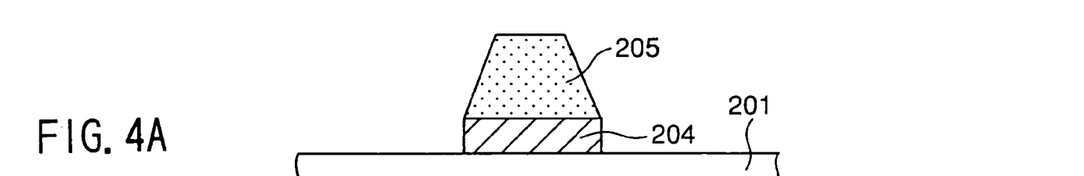
FIGS. 4A–4F are diagrams showing the fabrication process of a magneto-resistive head according to a second embodiment of the present invention.

Referring to FIG. 4A, a magneto-resistive film such as a GMR film or a TMR film similarly to the magneto-resistive film 104 is formed on a substrate 201, and a resist pattern 205 is formed on the magneto-resistive film. Further, the magneto-resistive film is subjected to a patterning process while using the resist pattern 205 as a mask, and there is formed a magneto-resistive pattern 204 underneath the resist pattern 205 in conformity therewith.

Figure 4B:
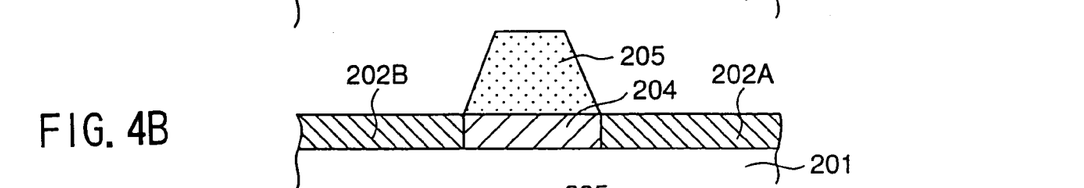

Next, in the step of FIG. 4B, a layer of a high-coercive material such as a ferromagnetic layer of CoCrPt, or an anti-ferromagnetic layer of PdPtMn, is deposited on the structure of FIG. 4A while using the same resist pattern 205 as a mask, and there are formed high-coercive regions 202A and 202B at both lateral sides of the magneto-resistive pattern 204 in self-alignment with the resist pattern 205, and hence with the magneto-resistive pattern 204.

Figure 4C:
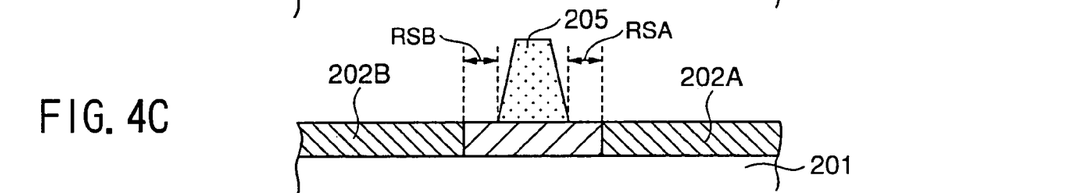

Next, in the step of FIG. 4C, the resist pattern 205 is subjected to a shrinking process similarly to the step of FIG. 3C, and there are formed regions RSA and RSB at both lateral edges of the magneto-resistive pattern 204 in which the surface of the magneto-resistive pattern 204 is exposed.

Figure 4D:
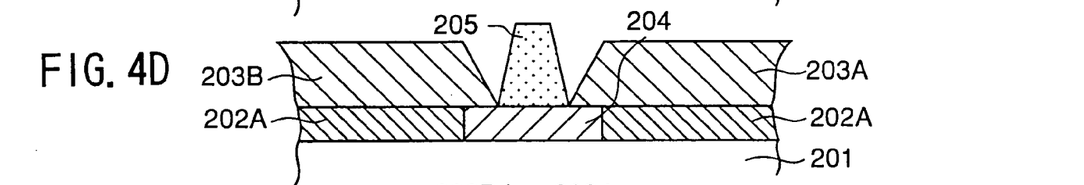
Figure 4E:
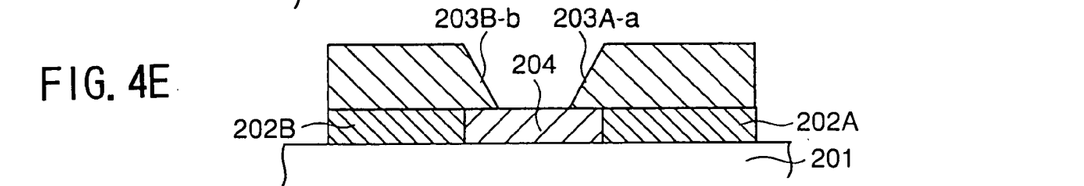

Next, in the step of FIG. 4D, a conductive layer such as Pt is deposited on the structure of FIG. 4C while using the shrunken resist pattern 205 as a mask, to form electrodes 203A and 203B respectively on the high-coercive regions 202A and 202B, wherein the electrode 203A has a tip-end part 203A-a extending over the magneto-resistive pattern 204 toward the opposing electrode 203B beyond the boundary between the high-coercive region 202A and the magneto-resistive pattern 204. Similarly, the electrode 203B has a tip-end part 203B-b extending over the magneto-resistive pattern 204 toward the opposing electrode 203A beyond the boundary between the high-coercive region 202B and the magneto-resistive pattern 204, as represented in FIG. 4E. It should be noted that the structure of FIG. 4E represents the state in which the structure of FIG. 4D is patterned on the substrate 201 by a suitable process such as an ion milling process.

Figure 4F:
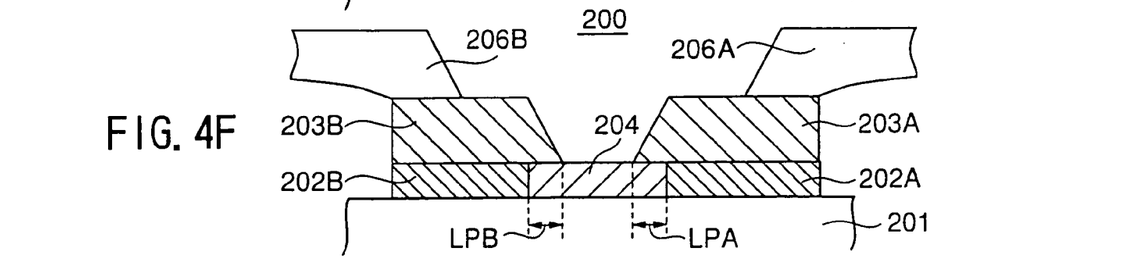

Further, interconnection patterns 206A and 206B are provided on the electrodes 203A and 203B in the step of FIG. 4F.

According to the present invention, it becomes possible to reduce the deviation between the geometrical or optical core width, defined as the distance between the very tip end of the tip-end region 203A-a and the very tip end of the tip-end region 203B-b, and the effective or electrical core width in the magneto-resistive head 200, by employing a self-alignment process that uses the shrunken resist pattern 205 for controlling the protruding distance of the tip-end parts 203A-a and 203B-b of the electrodes 203A and 203B. As a result of the use of the self-alignment process as explained with reference to FIGS. 4D and 4E, it becomes possible to reduce the protruding distance LPA or LPB (see FIG. 4F) of the tip-end part 203A-a or 203B-b of the electrode 203A or 203B beyond the high-coercive region 202A or 202B, to be 0.25 μm or less. Thereby, the injection of the sensing current is caused only from the very tip end of the protruding tip-end part 203A-a or 203B-b while successfully avoiding unwanted injection of the sensing current from the remaining part of the tip-end part 203A-a or 203B-b protruding beyond the dead region. Thereby, the sensitivity of magnetic signals from a narrow magnetic track is improved.

In the present embodiment, it should be noted that the protruding distance LPA or LPB can be controlled as desired by controlling the amount of shrinkage of the resist pattern 205 in the step of FIG. 4C.

As the shrinkage of the resist pattern 205 is caused symmetrically, the present embodiment successfully avoids the problem of lateral deviation of the electrodes 203A and 203B, and hence the tip-end regions 203A-a and 203B-b, with respect to the high-coercive regions 202A and 202B.

Figure 5:
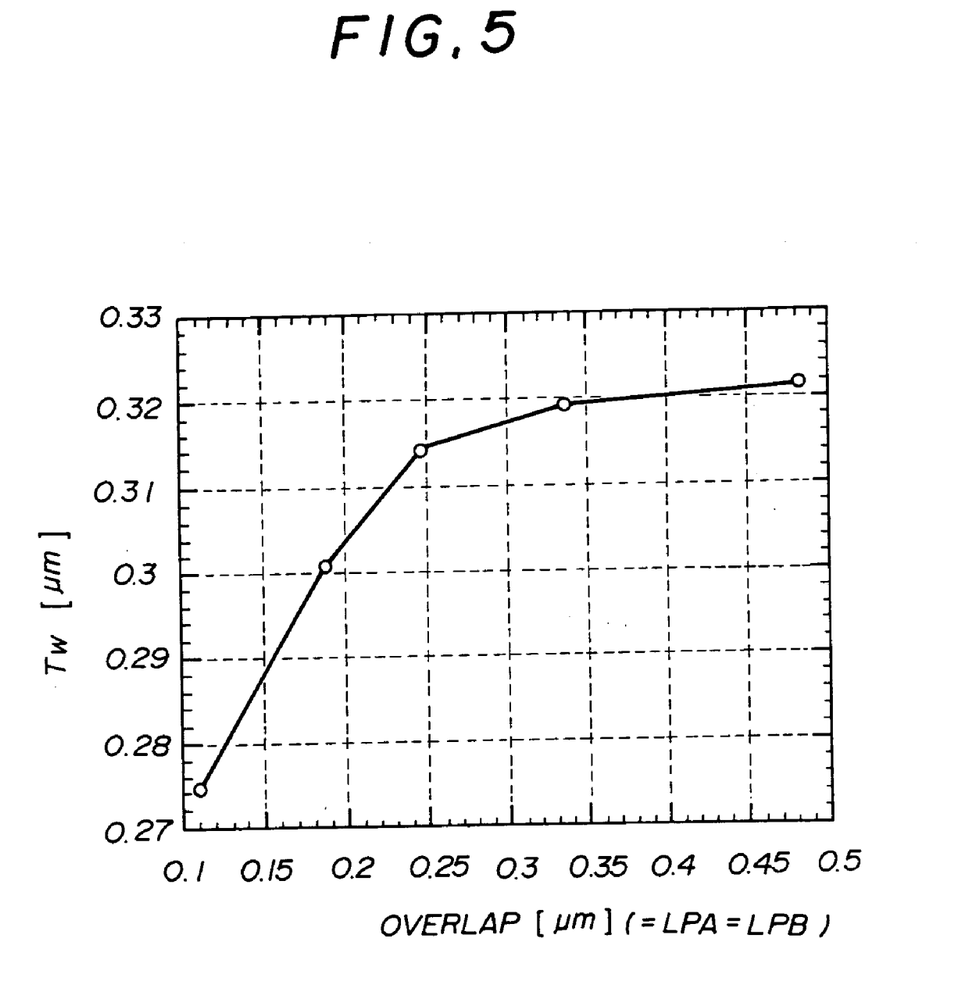
FIG. 5 is a diagram showing the relationship between an effective core width and an electrode overlap in the magneto-resistive head of the second embodiment.

FIG. 5 shows the relationship between the effective core width TW (see FIG. 1B) and the protruding distance LPA or LPB of the tip-end part 203A-a or 203B-b of the electrodes 203A or 203B for the magneto-resistive head 200 of FIG. 4H.

Referring to FIG. 5, it can be seen that the effective core width TW starts to decrease rapidly when the protruding distance LPA or LPB is decreased below about 0.25 µm. The magnetic head 200 of the present embodiment can easily realize the protruding distance of below about 0.25 µm, by controlling the shrinkage of the resist pattern 205 in the step of FIG. 4C.

[Third Embodiment]

Figure 6:
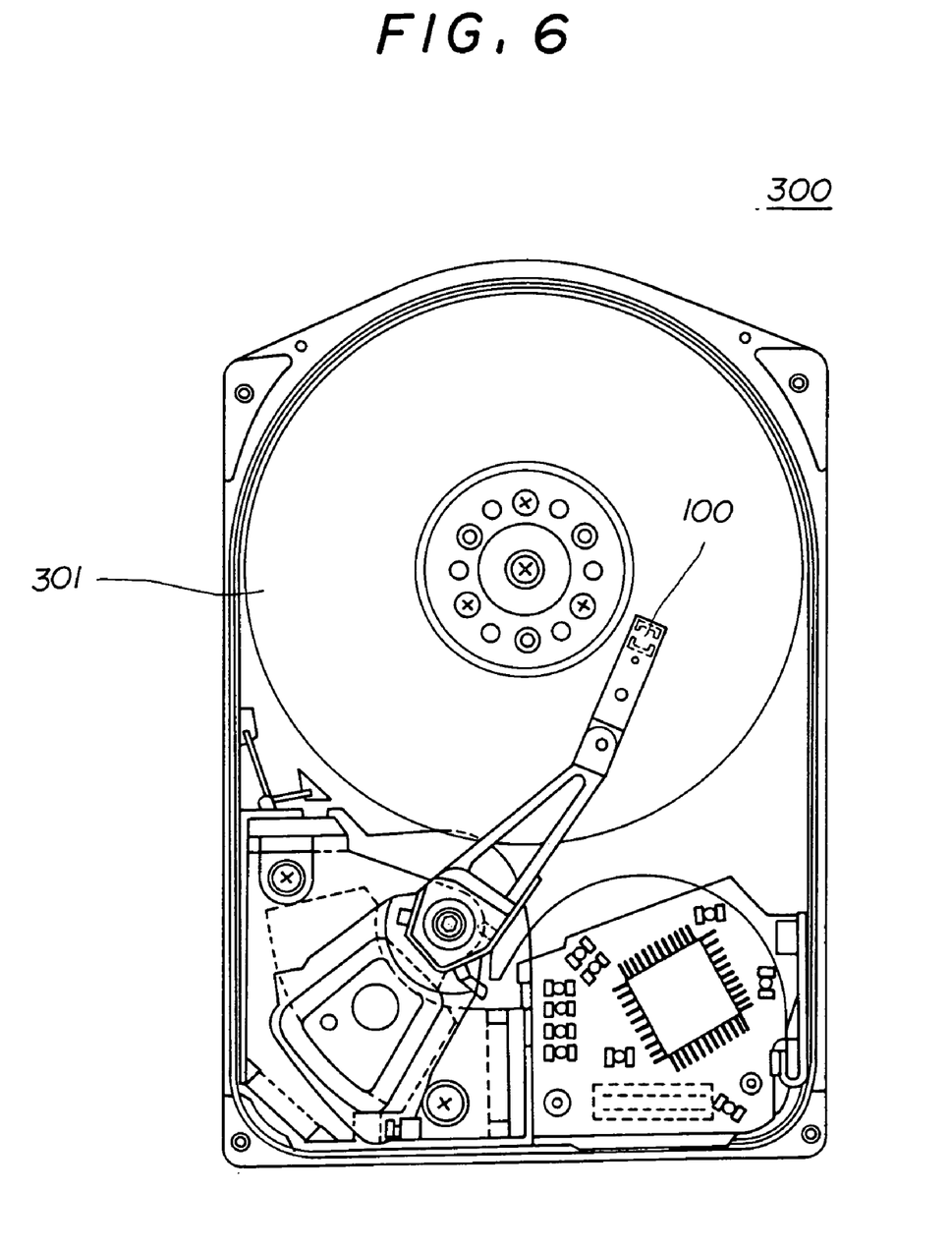
FIG. 6 is a diagram showing the construction of a magnetic disk drive according to a third embodiment of the present invention in a plan view.

FIG. 6 shows the construction of a magnetic disk drive 300 according to a third embodiment of the present invention, wherein the magnetic disk drive 300 uses a magnetic head of any of the preceding embodiments.

Referring to FIG. 6, the magnetic disk drive 300 includes a rotating magnetic disk 301 and a magnetic head 100 held on an end of an arm scans over the surface of the rotating magnetic disk 301.

By using the magnetic head 100 of the first embodiment or the magnetic head 200 of the second embodiment, it becomes possible to read information at high speed and high resolution even in the case the magnetic disk 301 is recorded with information with high density and the track width thereon is reduced accordingly.

Further, the present invention is not limited to the embodiments described heretofore, but various variations and modifications may made without departing from the scope of the invention.

What is claimed is:

1. A magnetic head, comprising:
a magneto-resistive film having a ferromagnetic free layer at a top part thereof, said ferromagnetic free layer changing a magnetization thereof in response to an external magnetic field;
first and second magnetic domain control patterns provided on said ferromagnetic free layer, each of said first and second magnetic domain control patterns causing a pinning of magnetization in said ferromagnetic free layer in the vicinity thereof;
a first electrode provided on said ferromagnetic free layer in contact therewith at a region located between said first and second magnetic domain control patterns; and
a second electrode provided in electrical contact with a bottom surface of said magneto-resistive film,
said magnetic head being a CPP type magnetic head,
said magnetic head further comprising a first insulating film covering said first magnetic domain control pattern and a second insulating film covering said second magnetic domain control pattern, said first insulating film being interposed between said first magnetic domain control pattern and said first electrode on a top surface of said magneto-resistive film, and said second insulating film being interposed between said second magnetic domain control pattern and said first electrode on the top surface of said magneto-resistive film.

2. A magnetic head as claimed in claim 1, wherein said first and second insulating films have a generally identical thickness.

3. A magnetic head, comprising:
a magneto-resistive film;
a pair of magnetic domain control patterns provided at both lateral edges of said magneto-resistive film, each of said magnetic domain control patterns causing a pinning of magnetization in said magneto-resistive film in the vicinity thereof, each of said magnetic domain control patterns being defined by an outer edge;
a pair of electrodes provided respectively on said pair of magnetic domain control regions with a mutual separation from each other, each electrode having a tip-end part extending over said magneto-resistive film toward the other electrode, each of said electrodes being defined by an outer edge aligned with a corresponding outer edge of a corresponding magnetic domain control pattern underlying said electrode,
wherein each tip-end part extends beyond said domain control region, on which said electrode having said tip-end part is provided, with a protruding distance of 0.25 µm or less.

4. A magnetic disk apparatus, comprising:
a rotary magnetic disk; and
a magnetic head scanning over a surface of said magnetic disk,
said magnetic head comprising:
a magneto-resistive film having a ferromagnetic free layer at a top part thereof, said ferromagnetic free layer changing a magnetization thereof in response to an external magnetic field;
first and second magnetic domain control patterns provided on said ferromagnetic free layer, each of said first and second magnetic domain control patterns causing a pinning of magnetization in said ferromagnetic free layer in the vicinity thereof;
a first electrode provided on said ferromagnetic free layer in contact therewith at a region located between said first and second magnetic domain control patterns; and
a second electrode provided in electrical contact with a bottom surface of said magneto-resistive film,
said magnetic head being a CPP type magnetic head,
said magnetic head further comprising a first insulating film covering said first magnetic domain control pattern and a second insulating film covering said second magnetic domain control pattern, said first insulating film being interposed between said first magnetic domain control pattern and said first electrode on a top surface of said magneto-resistive film, and said second insulating film being interposed between said second magnetic domain control pattern and said first electrode on the top surface of said magneto-resistive film.

5. A magnetic disk apparatus, comprising:
a rotary magnetic disk; and
a magnetic head scanning over a surface of said magnetic disk,
said magnetic head comprising:
a magneto-resistive film;
a pair of magnetic domain control patterns provided at both lateral edges of said magneto-resistive film, each of said magnetic domain control patterns causing a pinning of magnetization in said magneto-resistive film in the vicinity thereof, each of said magnetic domain control patterns being defined by an outer edge;

a pair of electrodes provided respectively on said pair of magnetic domain control regions with a mutual separation from each other, each electrode having a tip-end part extending over said magneto-resistive film toward the other electrode, each of said electrodes being defined by an outer edge aligned with a corresponding outer edge of a corresponding magnetic domain control pattern underlying said electrode, wherein each tip-end part extends beyond said domain control region, on which said electrode having said tip-end part is provided, with a protruding distance of 0.25 μm or less.

* * * * *